US012342752B2

(12) United States Patent
Inaba et al.

(10) Patent No.: US 12,342,752 B2
(45) Date of Patent: Jul. 1, 2025

(54) AUTONOMOUS TRAVEL ROBOTIC WORKING MACHINE

(71) Applicant: YAMABIKO CORPORATION, Ohme (JP)

(72) Inventors: Eiki Inaba, Ohme (JP); Kenji Nakano, Ohme (JP)

(73) Assignee: Yamabiko Corporation, Tokyo (JP)

( * ) Notice: Subject to any disclaimer, the term of this patent is extended or adjusted under 35 U.S.C. 154(b) by 714 days.

(21) Appl. No.: 17/762,058

(22) PCT Filed: Sep. 23, 2020

(86) PCT No.: PCT/JP2020/035730
§ 371 (c)(1),
(2) Date: Mar. 19, 2022

(87) PCT Pub. No.: WO2021/060254
PCT Pub. Date: Apr. 1, 2021

(65) Prior Publication Data
US 2022/0322603 A1 Oct. 13, 2022

(30) Foreign Application Priority Data
Sep. 27, 2019 (JP) .................................. 2019-177045

(51) Int. Cl.
*A01D 34/00* (2006.01)
*A01D 34/81* (2006.01)
(Continued)

(52) U.S. Cl.
CPC ........... *A01D 34/008* (2013.01); *A01D 34/81* (2013.01); *A01D 67/00* (2013.01); *A01D 67/005* (2013.01); *G05D 1/0238* (2013.01)

(58) Field of Classification Search
CPC ...... A01D 34/008; A01D 67/00; A01D 34/81; A01D 34/82; A01D 67/05; F16F 1/36;
(Continued)

(56) References Cited

U.S. PATENT DOCUMENTS

| 10,716,254 B2 * | 7/2020 | Song ..................... A01D 34/008 |
| 11,009,878 B2 * | 5/2021 | Matsuzawa .......... A01D 34/008 |
| 11,129,326 B2 * | 9/2021 | Hong ..................... A01D 34/81 |

FOREIGN PATENT DOCUMENTS

| CN | 106 717 559 A | 5/2017 | |
| CN | 206442715 U * | 8/2017 | ............. A01D 75/18 |

(Continued)

OTHER PUBLICATIONS

European Search Report issued in European Patent Application No. 20869438.0 mailed Nov. 24, 2022.

*Primary Examiner* — Joseph M Rocca
*Assistant Examiner* — Sunny D Webb
(74) *Attorney, Agent, or Firm* — BakerHostetler

(57) ABSTRACT

The autonomous travel working machine includes a working body unit, a cover unit, and a connecting structure unit connecting the working body unit and the cover unit. The connecting structure unit includes a body connecting section attached to the working body unit and a cover connecting section attached to the cover unit. When the cover unit is lifted, a shaft portion of the cover unit is slid upwardly with respect to a head portion of the working body unit so that the cover unit is moved upwardly or lifted with respect to the working body unit. When the working machine hits against an obstacle, an intermediate portion of the body connecting section is resiliently deformed in a lateral direction so that the cover unit is moved with respect to the working body unit substantially only in the lateral direction.

3 Claims, 5 Drawing Sheets

(51) Int. Cl.
*A01D 67/00* (2006.01)
*G05D 1/00* (2006.01)

(58) Field of Classification Search
CPC .......... G05D 1/02; B62D 24/04; B62D 27/04; B62D 24/02; B60G 99/002
See application file for complete search history.

(56) References Cited

FOREIGN PATENT DOCUMENTS

| | | |
|---|---|---|
| EP | 2 425 700 A2 | 3/2012 |
| WO | 2015/198629 A1 | 12/2015 |
| WO | 2017/109879 A1 | 6/2017 |
| WO | 2018/100659 A1 | 6/2018 |
| WO | WO-2018174777 A1 * | 9/2018 ............. A01D 34/00 |

* cited by examiner

AUTONOMOUS TRAVEL ROBOTIC WORKING MACHINE

CROSS-REFERENCE TO RELATED APPLICATIONS

This application is a National Stage of International patent application PCT/JP2020/035730, filed on Sep. 23, 2020, which claims priority to foreign Japanese patent application No. 2019-177045, filed on Sep. 27, 2019, the disclosures of which are incorporated by reference in their entirety.

TECHNICAL FIELD

The present invention relates to an autonomous travel robotic working machine, such as a robotic lawn mower, or a robotic machine for collecting golf balls.

BACKGROUND ART

A robotic working machine is known, which working machine performs operations while it autonomously travels within a predetermined traveling area. For example, a robotic lawn mower performs a lawn mowing operation while it autonomously travels throughout a predetermined traveling area. When such a robotic lawn mower hits against an obstacle, such as a tree or a fence, the lawn mower is required to change a travelling direction for continuing the lawn mowing operation. Further, when a person picks up or lifts the robotic lawn mower during the lawn mowing operation, the robotic lawn mower is required to be stopped because a mowing cutter is exposed. Thus, the robotic lawn mower has a function of detecting that it hits against an obstacle and a function of detecting that it is lifted. Specifically, the robotic lawn mower has a working body unit and a cover unit and is configured to detect the cover unit moved with respect to the working body unit in a horizontal direction (or a direction parallel to a traveling surface) when the robotic lawn mower hits against an obstacle. Further, the robotic lawn mower is configured to detect the cover unit moved with respect to the working body unit in a vertical direction (or a direction normal to the traveling surface) when the robotic lawn mower is lifted,

PRIOR ART PUBLICATION

Patent Publication 1: European Patent No. 2 425 700

SUMMARY OF THE INVENTION

Problem to be Solved by the Invention

In the conventional robotic working machine, when the cover unit is subjected to a large impact by hitting against an obstacle, the cover unit may be moved with respect to the working body unit not only in the horizontal direction but also in the vertical direction. If this is the case, the robotic working machine would determine that it is lifted so that the robotic working machine would be stopped to interrupt the operation.

Thus, it is an object of the present invention to provide a robotic working machine having a novel structure which is configured to be allowed to distinguish the hitting state and the lifted state from each other.

Means for Solving the Problem

In order to accomplish this object, an autonomous travel robotic working machine according to the present invention comprises a travelable working body unit, a cover unit covering the working body unit, and a connecting structure unit connecting the working body unit with the cover unit, wherein the connecting structure unit includes a body connecting section attached to the working body unit, and a cover connecting section attached to the cover unit, wherein the cover connecting section includes a shaft portion extending in an up-down direction, while the body connecting section includes a bottom portion fixed to the working body unit, an intermediate portion which is elastically deformable in a lateral direction, and a head portion which receives the shaft portion so as to be slidable in the up-down direction, wherein when the cover unit is lifted, the shaft portion is slid upwardly with respect to the head portion so that the cover unit is moved upwardly with respect to the working body unit, and wherein when the robotic working machine is traveling and hits against an obstacle, the intermediate portion is resiliently deformed in the lateral direction to allow the cover unit to move substantially only in the lateral direction with respect to the working body unit.

This autonomous travel robotic working machine has the connecting structure unit which connects the working body unit with the cover unit, and the connecting structure unit includes the body connecting section attached to the working body unit, and the cover connecting section attached to the cover unit. When the cover unit is lifted, the shaft portion of the cover connecting section is slid upwardly with respect to the head portion of the body connecting section, which causes the cover unit to be moved upwardly (or lifted) with respect to the working body unit. When the robotic working machine is travelling and hits against an obstacle, the intermediate portion of the body connecting section is resiliently deformed in the lateral direction, which causes the cover unit to be moved with respect to the working body unit substantially only in the lateral direction. Thus, the hitting state and the lifted state can be surely distinguished from each other with this simple structure.

In an embodiment of the autonomous travel robotic working machine according to the present invention, preferably, the working body unit includes a stopper which limits the lateral deformation of the intermediate portion of the body connecting section.

In this autonomous travel robotic working machine, the intermediate portion body of the connecting section is prevented from excessively deforming in the lateral direction and thus, is prevented from causing the movement in the up-down direction. Thus, the hitting state and the lifted state can be surely distinguished from each other.

In an embodiment of the autonomous travel robotic working machine according to the present invention, preferably, the cover connecting section is detachable from the body connecting section.

In this autonomous travel robotic working machine, by detaching the cover connecting section from the body connecting section, the cover unit can be detached from the working body unit. Thus, distinguishing the hitting state and the lifted state from each other is compatible with detaching the cover unit from the working body unit.

DESCRIPTION OF EMBODIMENTS

Referring to the figures, a robotic lawn mower which is an embodiment of an autonomous travel robotic working machine according to the present invention will be explained.

Figure 1:
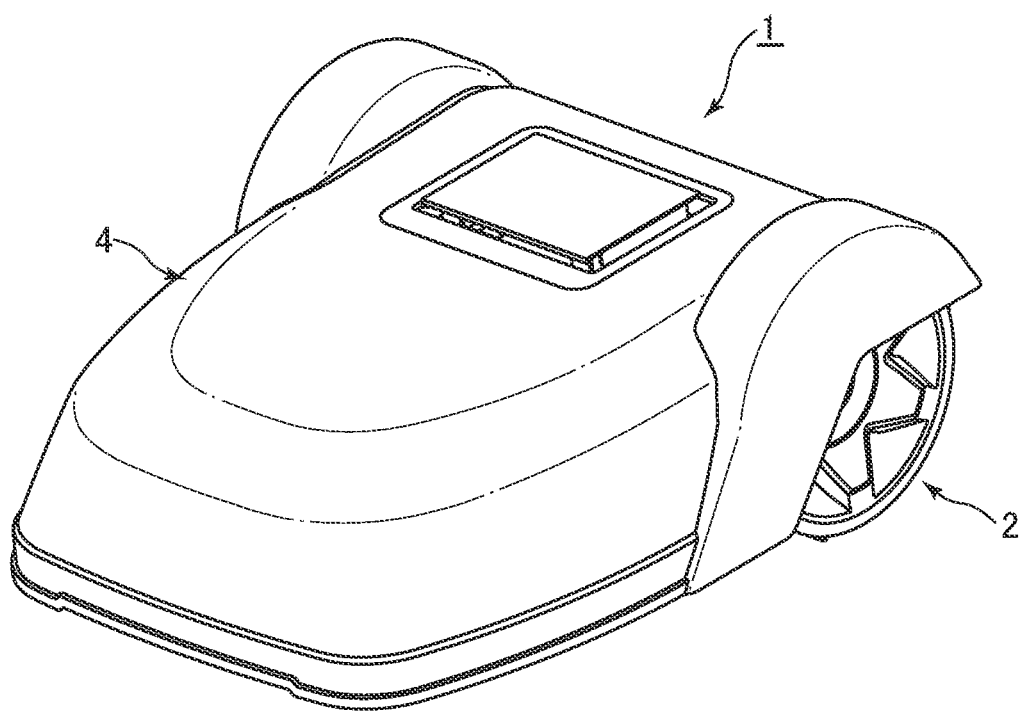
FIG. 1 is a schematic perspective view of a robotic lawn mower.

As shown in FIG. 1, a robotic lawn mower 1 has a travelable working body unit 2, and a cover unit 4 covering the working body unit 2.

Figure 2:
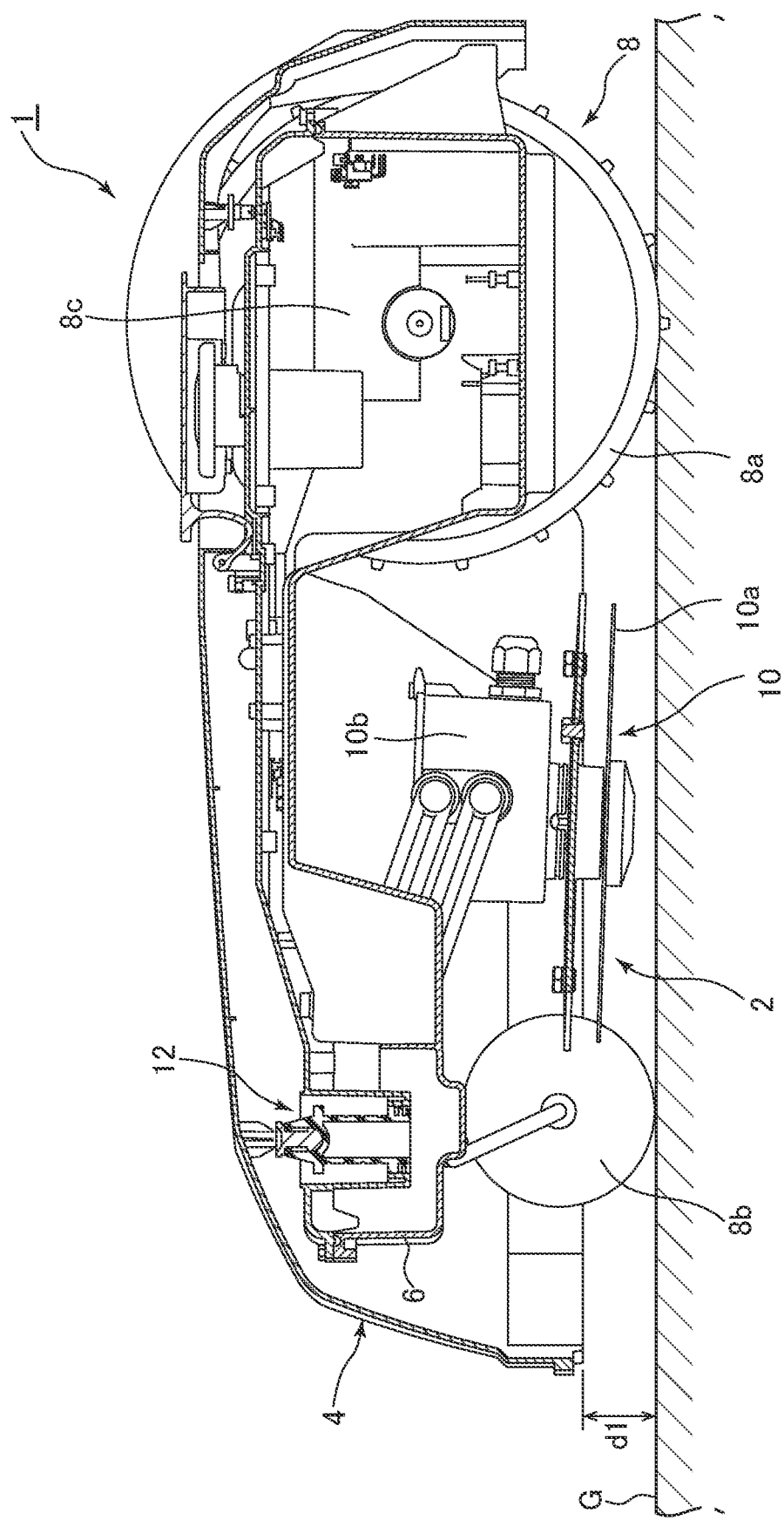
FIG. 2 is a cross-sectional view of the robotic lawn mower.

As shown in FIG. 2, the working body unit 2 includes a frame 6, a traveling section 8, and a working section 10, and the traveling and working sections 8, 10 are attached to the frame 6. The traveling section 8 includes two back wheels 8a, two front wheels 8b, and an electric motor 8c for driving the back wheels 8a. The working section 10 includes a mowing cutter 10a, and an electric motor 10b for driving the mowing cutter 10a.

The cover unit 4 entirely covers the working body unit 2 from its upside and prevents an operator and so on from contacting the mowing cutter 10a. A clearance d1 between the cover unit 4 and a travelling surface G is determined so that when the robotic working machine 1 is lifted, fingers may be inserted into the clearance d1, but tips of the fingers cannot reach the mowing cutter 10a.

The robotic lawn mower 1 further has connecting structure units 12 each of which connects the working body unit 2 and the cover unit 4 with each other. The connecting structure units 12 are configured to connect the cover unit 4 with the working body unit 2 so that the cover unit 4 can be moved upwardly and laterally with respect to the working body unit 2. In the present embodiment, the robotic lawn mower 1 has four connecting structure units 12 (see FIG. 3). As shown in FIG. 4, each of the connecting structure units 12 includes a body connecting section 16 attached to the working body unit 2, and a cover connecting section 14 attached to the cover unit 4.

The cover connecting section 14 is preferably made of a material such as resin and includes a shaft portion 14a extending in an up-down direction, a plate-like bracket 14b connected to a top end of the shaft portion 14a, and a semispherical enlarged portion 14c connected to a bottom end of the shaft portion 14a. A step between the shaft portion 14a and the enlarged portion 14c defines an annular upper surface 14d.

The body connecting section 16 is preferably made of a resilient material such as rubber and includes a bottom portion 16a fixed to the working body unit 2, an intermediate portion 16b which can be elastically deformed in a lateral direction, and a head portion 16c which receives the shaft portion 14a so that the shaft portion 14a is allowed to slide in the up-down direction.

The head portion 16c includes a lower enlarged flange 18a which is relatively rigid, and an upper attachment 18b which is relatively resilient. A shape of the attachment 18b is a frustum of a cone and includes a chamber 18c for receiving the semispherical enlarged portion 14c, and an aperture 18d which receives the shaft portion 14a so as to allow the shaft portion 14a to slide in the up-down direction. The chamber 18c has a volume so that the bracket 14b can be lowered until it abuts the head portion 16c. The attachment 18b further includes an annular lower surface 18e which the annular upper surface 14d can abut and which is adjacent to the aperture 18d so that an upward movement of the shaft portion 14a is limited (see FIG. 6). Further, the cover connecting section 14 is detachably attached to the body connecting section 16. Specifically, the enlarged portion 14c and the relatively resilient attachment 18b are configured so that the enlarged portion 14c can be put into and outside of the chamber 18c by enlarging the aperture 18d. Preferably, the attachment 18b includes an inclined surface 18f adjacent to the aperture 18d so that the enlarged portion 14c can be easily put into the chamber 18c.

The intermediate portion 16b is cylindrical with a thin wall and has a diameter which is smaller than that of the enlarged flange 18a. Further, the intermediate portion 16b is relatively resilient so that the intermediate portion 16b can be easily deformed in the lateral direction. The intermediate portion 16b may be provided with grooves 20a extending in a peripheral direction to promote the deformation, while it may be provided with ribs 20b extending in the up-down direction to prevent the intermediate portion 16b from bending.

The bottom portion 16a is relatively rigid and cylindrical. The bottom portion 16a has an outer diameter which is approximately the same as that of the enlarged flange 18a, a male thread 22a, and an inner diameter which is approximately the same as that of the intermediate portion 16b.

The working body unit 2 has a stopper (or a wall) 24 which limits the deformation of the intermediate portion 16b of the body connecting section 16 in the lateral direction. Specifically, the working body unit 2 includes a female thread 26a which threadably engages the male thread 22a of the bottom portion 16a, and the wall 24 which defines a cylindrical space 26b accommodating the body connecting section 16. A clearance d2 between the wall 24 and the enlarged flange 18a is defined to limit the lateral movement of the enlarged flange 18a, and this means that the wall 24 functions as the stopper.

Further, as shown in FIG. 4, the robotic lawn mower 1 includes first and second magnets 30, 32 which are attached to the working body unit 2, and first and second detecting portions 34, 36 which are attached to the cover unit 4. Each of the first detecting portions 34 detects the corresponding first magnet 30, and each of the second detecting portions 36 detects the corresponding second magnet 32. The robotic lawn mower 1 also includes a controller 38 connected to the first and the second detecting portions 34, 36. The controller 38 is also connected to and controls the electric motors 8c, 10b.

The first detecting portion 34 defines a detecting area d31 in the up-down direction and a detecting area d41 in the lateral direction. The second detecting portion 36 defines a detecting area d32 in the up-down direction and a detecting area d42 in the lateral direction. An extent of the detecting area d31 of the first detecting portion 34 in the up-down direction substantially equals to that of the detecting area d32 of the second detecting portion 36 in the up-down direction. Further, an extent of the detecting area d41 of the first detecting portion 34 in the lateral direction substantially equals to that of the detecting area d42 of the second detecting portion 36 in the lateral direction. Thus, the first and second detecting portions 34, 36 can be configured by the same components and for example loaded on respective substrates 40 with the same structures. The first and second detecting portions 34, 36 are, for example, hall sensors. The hall sensor is not necessarily a three dimensional sensor and is enough to detect whether or not the magnet 30, 32 is present in the detecting areas d31, d32, d41, d42.

Further, a lateral dimension d51 of the first magnet 30 is larger than a lateral dimension d52 of the second magnet 32.

Figure 3:
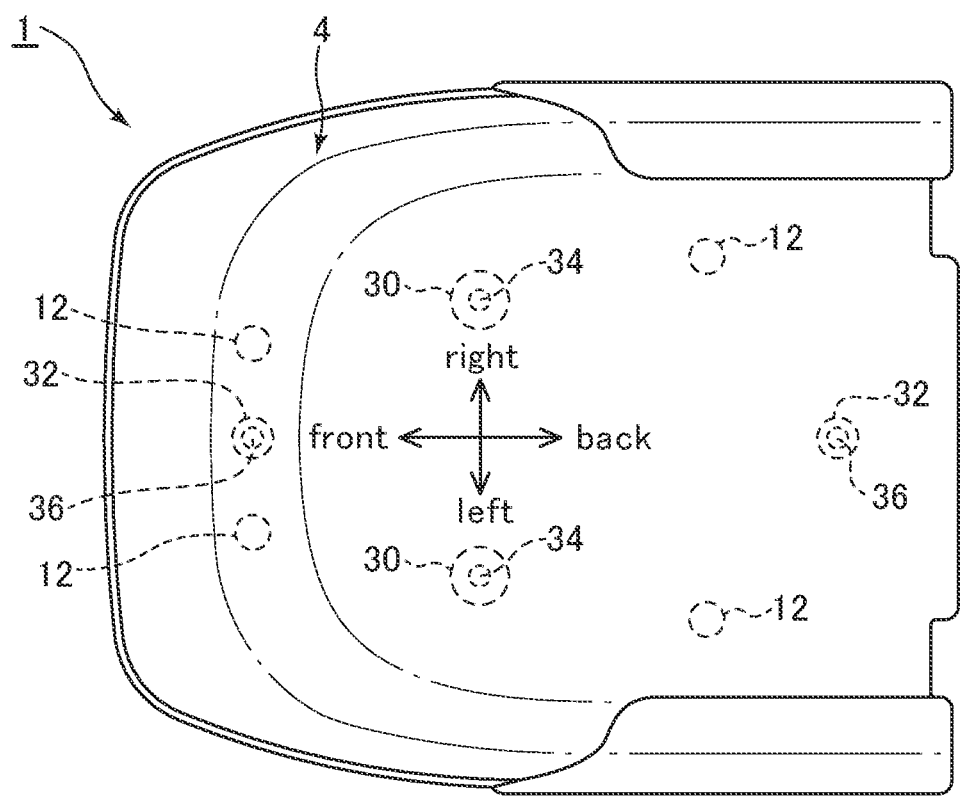
FIG. 3 is a plan view of the robotic lawn mower.
Figure 4:
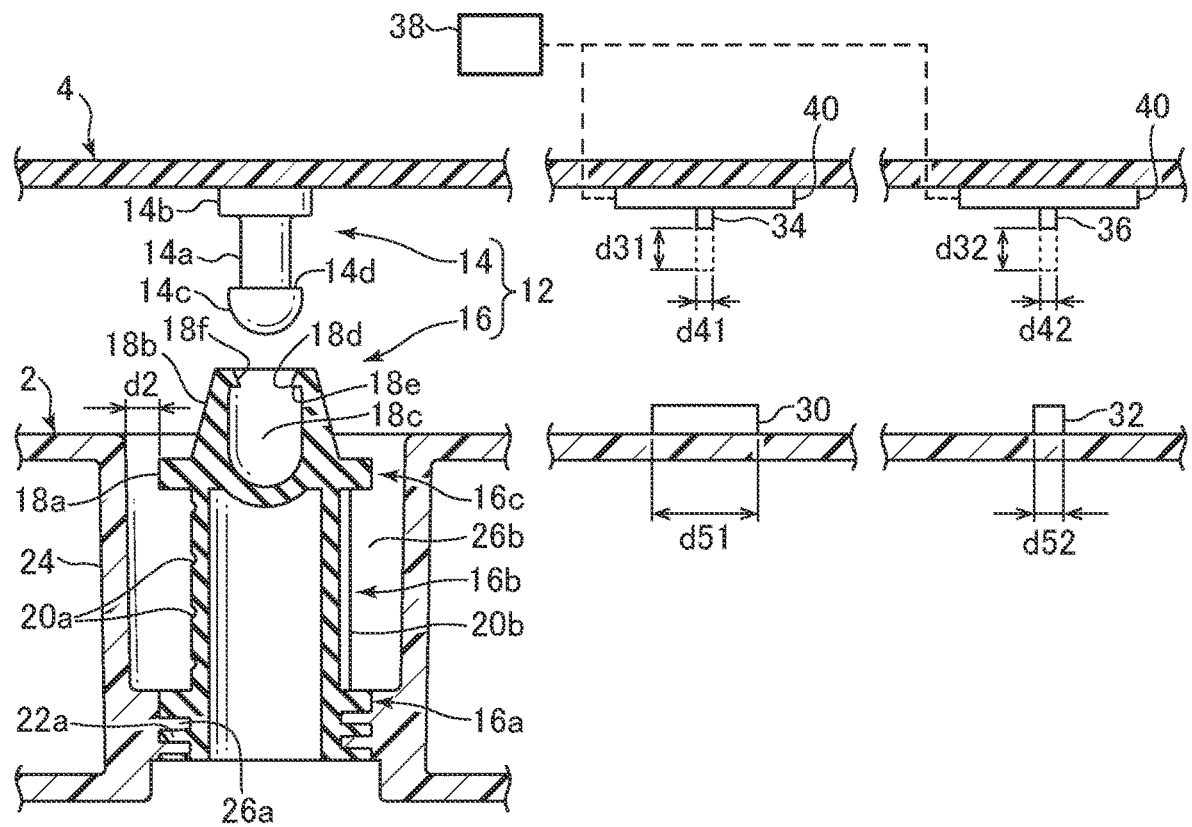
FIG. 4 is a cross-sectional view of a connecting structure unit, magnets, and detecting portions.

As shown in FIG. 3, a plurality of pairs of the first magnet 30 and the first detecting portion 34 and a plurality of pairs of the second magnet 32 and the second detecting portion 36 are arranged. This arrangement may be determined so that when a portion of the cover unit 4 is lifted, in at least two adjacent pairs of the magnets and detecting portion, the detecting portions 34, 36 do not detect the magnets 30, 32. These two adjacent pairs may be two pairs of the first magnet 30 and the first detecting portion 34, or two pairs of the second magnet 32 and the second detecting portion 36, or a combination of one pair of the first magnet 30 and the first detecting portion 34 with one pair of the second magnet 32 and the second detecting portion 36. In the present embodiment, two pairs of the first magnet 30 and the first detecting portion 34 and two pairs of the second magnet 32 and the second detecting portion 36 are arranged alternatively in a peripheral direction of the robotic lawn mower 1. Specifically, two pairs of the first magnet 30 and the first detecting portion 34 are disposed on the left and right sides of the robotic lawn mower 1, while two pairs of the second magnet 32 and the second detecting portion 36 are disposed on the front and back sides of the robotic lawn mower 1.

Next, an operation of the robotic lawn mower according to the present invention will be explained.

Figure 5:
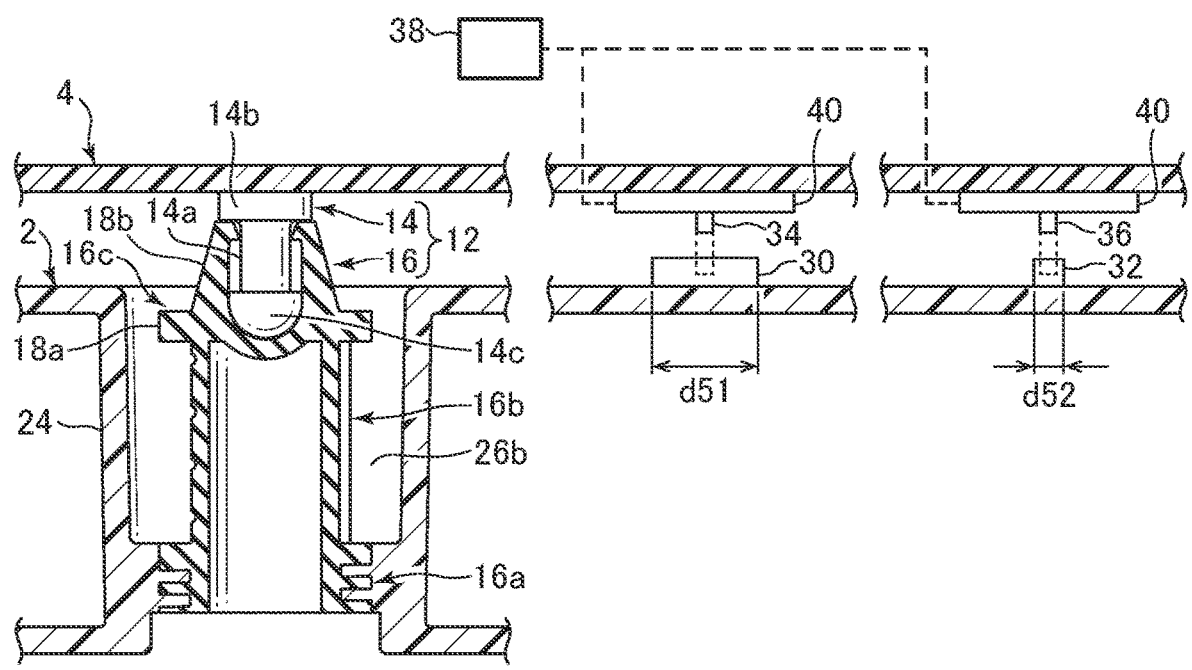
FIG. 5 is a cross-sectional view of the connecting structure unit, the magnets, and the detecting portions in a normal position.

In a normal operating state, in each of the connecting structure units 12 as shown in FIG. 5, the bracket 14b abuts the attachment 18b, and the head portion 16c is located approximately at the center of the space 26b in the plan view, namely, the cover connecting section 14 is in a normal position with respect to the body connecting section 16. At this time, all of the two first detecting portions 34 detect respective first magnets 30, and all of the two second detecting portions 36 detect respective second magnets 32. This allows the controller 38 to determine that the cover unit 4 is in a normal position with respect to the working body unit 2 so that a lawn mowing operation is continued.

Figure 6:
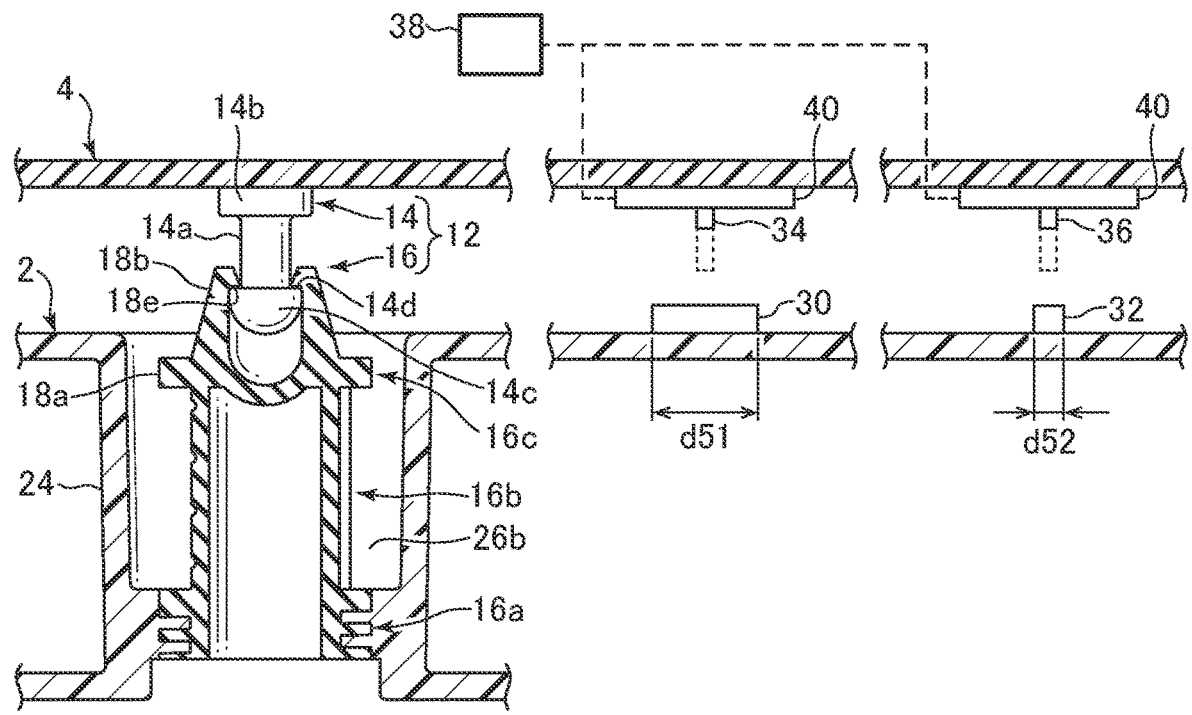
FIG. 6 is a cross-sectional view of the connecting structure unit, the magnets, and the detecting portions in a lifted position.

When the cover unit 4 is entirely lifted, in each of the connecting structure units 12 as shown in FIG. 6, the bracket 14b and the shaft portion 14a are slid upwardly with respect to the head portion 16c. This allows the cover unit 4 to be entirely moved upwardly with respect to the working body unit 2. At this time, since the detecting area d31 of the first detecting portion 34 in the up-down direction is the same as the detecting area d41 of the second detecting portion 36 in the up-down direction, none of the two first detecting portions 34 detect the respective first magnets 30, while none of the two second detecting portions 36 detect the respective second magnets 32. This allows the controller 38 to determine that the cover unit 4 is in a lifted position where the cover unit 4 is moved upwardly with respect to the working body unit 2 so that all of the electric motors 8c, 10b are stopped to ensure safety of the operator.

Further, when a portion, such as a front side portion, of the cover unit 4 is lifted, the brackets 14b and the shaft portions 14a near the lifted portion are slid upwardly with respect to the respective head portions 16c. Namely, the front-side portion of the cover unit 4 is moved upwardly with respect to the working body unit 2. The other brackets 14b still abut the attachments 18b. At this time, the left side and right side first detecting portions 34 and the front-side second detecting portion 36 become out of detection of the left-side and right side first magnets 30 and the front second magnet 32, respectively. This allows the controller 38 to determine that the cover unit 4 is in the lifted position where the cover unit 4 is moved upwardly with respect to the working body unit 2 so that all of the electric motor 8c, 10b are stopped to ensure the safety of the operator.

Further, when another portion, such as a right-front-side portion, of the cover unit 4 is lifted, the brackets 14b and the shaft portions 14a near the lifted portion are slid upwardly with respect to the head portion(s) 16c. Namely, the right-front-side portion of the cover unit 4 is moved upwardly with respect to the working body unit 2. At this time, the right-side first detecting portion 34 and the front-side second detecting portion 36 become out of detection of the right-side first magnet 30 and the front-side second magnet 32, respectively. This allows the controller 38 to determine that the cover unit 4 is in the lifted position where the cover unit 4 is moved upwardly with respect to the working body unit 2 so that all of the electric motors 8c, 10b are stopped to ensure the safety of the operator.

Figure 7:
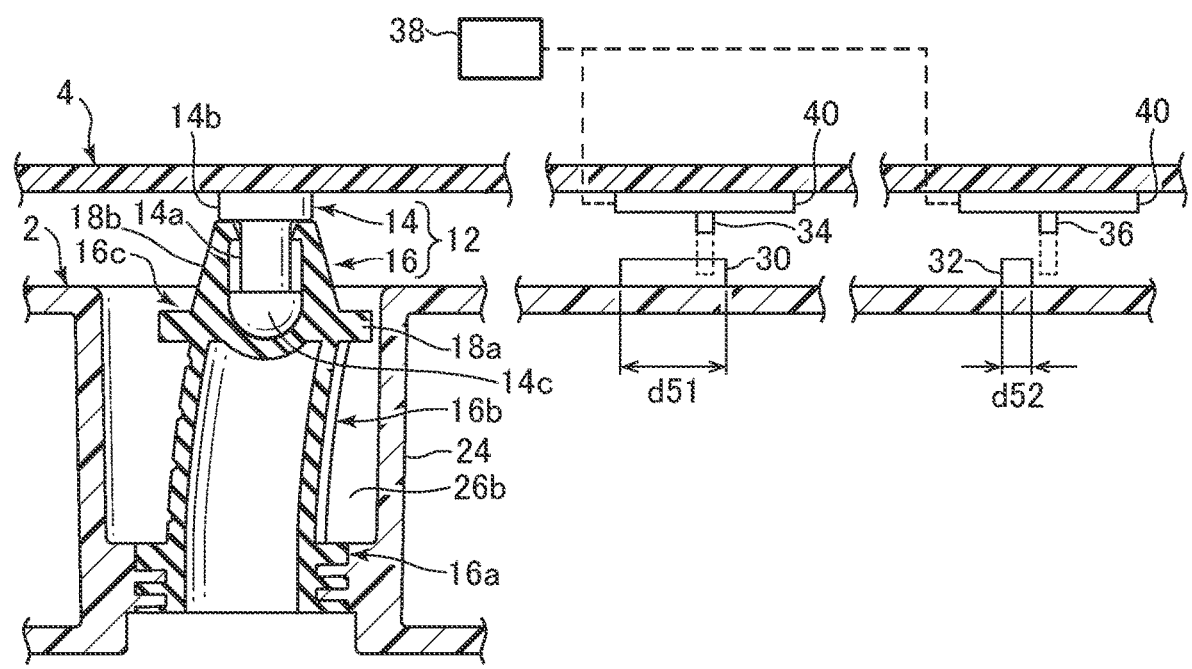
FIG. 7 is a cross-sectional view of the connecting structure unit, the magnets, and the detecting portions in a hitting position.

When the robotic working machine hits against an obstacle while it is traveling, in each of the connecting structure units 12 as shown in FIG. 7, the intermediate portion 16b is resiliently deformed in the lateral direction (or a direction parallel to the travelling surface G) while the bracket 14b still abuts the attachment 18b. Namely, the cover unit 4 is moved substantially in the lateral direction with respect to the working body unit 2. At this time, since the lateral dimension d51 of the first magnet 30 is larger than the lateral dimension d52 of the second magnet 32, all of the two first detecting portions 34 still detect the respective first magnets 30, while all of the two second detecting portions 36 become out of detection of the respective second magnets 32. This allows the controller 38 to determine that the cover unit 4 is in a hitting position where the cover unit 4 is moved in the lateral direction with respect to the working body unit 2 so that the robotic lawn mower 1 is turned and the mowing operation is continued. In this way, the controller 38 may operate a logic for determining whether or not the cover unit 4 is in the hitting position with respect to the working body unit 2 by using a combination of whether or not the first detecting portions 34 detect the first magnets 30 with whether or not the second detecting portions 36 detect the second magnets 32.

As explained above, by using the two kinds of simple components (namely, the cover connecting sections 14 and the body connecting sections 16) which do not employ any springs and so on, relative movements between the cover unit 4 and the working body unit 2 at the hitting state and at the lifted state can be surely distinguished from each other. Further, by employing the two kinds of combinations of the simple structures, namely, the magnets and the detecting portions, relative movements between the cover unit 4 and the working body unit 2 at the hitting state and at the lifted state can be surely distinguished and detected.

Although the embodiment of the present invention has been explained, the present invention is not limited to the embodiment, namely, various modification can be made within the scope of the claims and it is obvious such modification falls within the scope of the present invention.

Although in the above embodiment, the first and second magnets 30, 32 are attached to the working body unit 2, while the first and second detecting portion 34, 36 are attached to the cover unit 4, the first magnet 30 and/or the second magnet 32 may be attached to the cover unit 4, while the first detecting portion 34 and/or the second detecting portion 36 may be attached to the working body unit 2.

In the above embodiment, the pairs of the first magnet 30 and the first detecting portion 34 and the pairs of the second magnet 32 and the second detecting portion 36 are alternately arranged in the peripheral direction of the robotic lawn mower 1. This ensures uniform detection when the robotic lawn mower 1 hits against an obstacle in any directions. However, if such a hitting state can be detected, any numbers and any locations of each of the elements, namely, the connecting structure unit 12, the first magnet 30, the second magnet 32, the first detecting portion 34 and the second detecting portion 36, may be employed. Further, such numbers and locations are appropriately determined depending on the robotic working machine 1.

In the present embodiment, the autonomous travel robotic working machine is the robotic lawn mower, but the robotic working device may be, for example, a robotic machine for collecting golf balls.

LISTING OF COMPONENTS BY REFERENCE NUMERAL

1: robotic working machine
2: working body unit
4: cover unit
6: frame
8: traveling section
8a: back wheels
8b: front wheels
8c: electric motor
10: working section
10a: mowing cutter
10b: electric motor
12: connecting structure unit
14: cover connecting section
14a: shaft portion
14b: plate-like bracket
14c: enlarged portion
14d: upper surface
16: body connecting section
16a: bottom portion
16b: intermediate portion
16c: head portion
18a: lower enlarged flange
18b: attachment
18c: chamber
18d: aperture
18e: lower surface
18f: inclined surface
20a: grooves
20b: ribs
22a: male thread 24: stopper
26a: female thread
26b: cylindrical space
30: first magnet
32: second magnet
34: first detecting portion
36: second detecting portion
38: controller
40: respective substrates
d1: clearance
d2 clearance
d31: detecting area of the first detecting portion in the up-down direction
d32: detecting area of the second detecting portion in the up-down direction
d51: dimension of the first magnet in the lateral direction
d52: dimension of the second magnet in the lateral direction
G: travelling surface

What is claimed:

1. An autonomous travel robotic working machine comprising:
   a travelable working body unit;
   a cover unit covering the working body unit; and
   a connecting structure unit connecting the working body unit with the cover unit;
   wherein the connecting structure unit includes a body connecting section attached to the working body unit, and a cover connecting section attached to the cover unit,
   wherein the cover connecting section includes a shaft portion extending in an up-down direction,
   wherein the body connecting section is made of a resilient material and includes a bottom portion fixed to the working body unit, an intermediate portion which is elastically deformable in a lateral direction, and a head portion which receives the shaft portion so as to be slidable in the up-down direction,
   wherein when the cover unit is lifted, the shaft portion is slid upwardly with respect to the head portion so that the cover unit is moved upwardly with respect to the working body unit, and
   wherein when the robotic working machine is traveling and hits against an obstacle, the intermediate portion is resiliently deformed in the lateral direction to allow the cover unit to move substantially only in the lateral direction with respect to the working body unit.

2. The robotic working machine according to claim 1, wherein the working body unit includes a stopper which limits a lateral deformation of the intermediate portion of the body connecting section.

3. The robotic working machine according to claim 1, wherein the cover connecting section is detachable from the body connecting section.

* * * * *